United States Patent
Kim et al.

(10) Patent No.: US 11,467,319 B2
(45) Date of Patent: Oct. 11, 2022

(54) RAINWATER GUIDANCE DEVICE FOR METEOROLOGICAL OBSERVATION BALLOON

(71) Applicant: NATIONAL INSTITUTE OF METEOROLOGICAL SCIENCES, Jeju-do (KR)

(72) Inventors: Seon Jeong Kim, Gangwon-do (KR); Geon Tae Kim, Gangwon-do (KR); Hyoung Gu Nam, Gangwon-do (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 0 days.

(21) Appl. No.: 17/564,690

(22) Filed: Dec. 29, 2021

(65) Prior Publication Data

US 2022/0206185 A1    Jun. 30, 2022

(30) Foreign Application Priority Data

Dec. 30, 2020  (KR) .......................... 10-2020-0187766

(51) Int. Cl.
*G01W 1/14*    (2006.01)
*G01W 1/08*    (2006.01)

(52) U.S. Cl.
CPC ................ *G01W 1/14* (2013.01); *G01W 1/08* (2013.01)

(58) Field of Classification Search
CPC ........... G01W 1/14; G01W 1/00; G01W 1/08; G01W 1/16; G01W 1/10; G01W 1/02;
(Continued)

(56) References Cited

U.S. PATENT DOCUMENTS

| 4,718,594 A | 1/1988 | Harazi |
| 10,813,483 B2 | 10/2020 | Povey |

(Continued)

FOREIGN PATENT DOCUMENTS

| CN | 201647253 U | 11/2010 |
| CN | 105607156 A * | 5/2016 .............. G01W 1/14 |

(Continued)

OTHER PUBLICATIONS

Jul. 27, 2021 Notice of Allowance issued in Korean Patent Application No. 10-2020-0187766.

*Primary Examiner* — Andre J Allen
(74) *Attorney, Agent, or Firm* — Oliff PLC

(57) ABSTRACT

A rainwater guiding device for a meteorological observation balloon for preventing the observer and electronic devices held by the observer from getting wet by rainwater by guiding the rainwater flowing down along the surface of the balloon to the outside of the observer's workspace during the rawinsonde levitation operation for upper atmospheric observation, wherein the rainwater guiding device is composed of a double-cone structure comprising an inner cone closely contacted with the surface of the balloon around the inlet and an outer cone formed on the outside of the inner cone, wherein the inner cone and the outer cone have funnel shapes, each of which has a conical portion at the upper portion as a shape gradually widening in the upward direction, and an extension portion at the lower portion extending vertically downward from a neck portion, which is a neck portion below the conical portion.

6 Claims, 6 Drawing Sheets

(58) Field of Classification Search
CPC ... G01W 1/04; G01W 1/06; G01W 2001/003;
G01W 1/12; G01W 1/17; G01W 2203/00;
G01W 1/18; G01W 2001/006
USPC .......................................... 73/170.14–170.34
See application file for complete search history.

(56) References Cited

U.S. PATENT DOCUMENTS

| | | |
|---|---|---|
| 2005/0006523 A1 | 1/2005 | French et al. |
| 2017/0251853 A1 | 9/2017 | Chung |
| 2022/0177107 A1* | 6/2022 | Kim .................... G01W 1/08 |

FOREIGN PATENT DOCUMENTS

| | | |
|---|---|---|
| JP | H06-51074 A | 2/1994 |
| JP | 2003137189 A | 5/2003 |
| KR | 101935856 B1 | 1/2019 |

* cited by examiner

RAINWATER GUIDANCE DEVICE FOR METEOROLOGICAL OBSERVATION BALLOON

CROSS REFERENCE TO RELATED APPLICATION

This application claims priority to and incorporates herein by reference all disclosure in Korean Patent Application No. 10-2020-0187766 filed in the Korean Intellectual Property Office (KIPO) on Dec. 30, 2020.

FIELD OF THE INVENTION

The present invention relates to a rainwater guiding device for a meteorological observation balloon, and more particularly, to a rainwater guiding device for a meteorological observation balloon for protecting an observer and electronic devices held by the observer from rainwater flowing down along the surface of the balloon.

BACKGROUND

The Meteorological Administration and meteorological research institutes generally use a rawinsonde to obtain observation data such as temperature, humidity, wind direction, and wind speed, etc. of the upper atmosphere. The rawinsonde refers to the principle of levitating a sensor capable of observing temperature, humidity, wind direction, and wind speed, etc. into the vertical atmosphere for observation of the upper atmosphere. The applicant currently observes the atmosphere in the vertical direction by attaching a sensor to a balloon and levitating it to observe the temperature and humidity of the upper atmosphere.

In order to levitate the rawinsonde observation balloon into the atmosphere, helium gas is generally injected into the balloon. At this time, the gas is injected using an air gun while holding the inlet portion of the balloon. At this time, the helium injection amount is usually injected with helium of 60 bar based on balloon of 600 g in order to satisfy the recommended ascent speed of 5 m/s of the balloon.

When helium gas is injected into the balloon, the balloon begins to swell due to the gas injection, and eventually becomes 150 cm in diameter and about 28 $m^2$ or more in surface area. When precipitation occurs, rainwater falling on the balloon collects along the surface of the balloon toward the handle at the bottom of the balloon and then flows down toward the observer, eventually affecting the body and electronic devices of the observer holding the balloon. In particular, a large amount of precipitation may affect the temperature and humidity sensors of the sonde and cause errors in them.

It usually takes about 20 to 30 minutes of preparation time for one levitation, and it may takes more time in bad weather due to the nature of the rawinsonde observation.

Accordingly, when performing the rawinsonde levitation in rainy weather, it is required to develop a method to prevent the observer's body from getting wet in the rain and to protect the observer's electronic devices in hand from rainwater.

SUMMARY OF THE INVENTION

Accordingly, the present invention has been made to solve the above problems, and an object of the present invention is to provide a Rainwater guiding device for a meteorological observation balloon for protecting the observer and electronic devices and sonde sensors held by the observer from rainwater by guiding rainwater flowing down along the surface of the balloon to the outside when the observer injects helium gas into the balloon or holds the balloon in order to levitate the sensors for the aerological meteorological observation into the atmosphere.

One aspect of the present invention for achieving the above object provides a Rainwater guiding device for a meteorological observation balloon for preventing an observer and electronic devices held by the observer from getting wet by rainwater by guiding the rainwater flowing down along the surface of the balloon to the outside of the observer's workspace during the rawinsonde levitation operation for upper atmospheric observation, wherein the rainwater guiding device has a double-cone structure composed of an inner cone closely contact with the surface adjacent an inlet of the balloon and an outer cone formed on the outside of the inner cone, wherein the inner cone and the outer cone have a funnel shape, each of which includes an upper conical portion in which the diameter gradually increases as going upwards, and a lower extension portion extending vertically downward from a neck portion below the conical portions, wherein the conical portion of the outer cone and the conical portion of the inner cone are formed integrally by being joined together at the neck portion, and the extension portion is provided as a single body below the neck portion, wherein the inner cone includes a mesh portion in at least a portion thereof above the neck portion, the mesh portion having a plurality of through holes formed therein in order to let the rainwater flowing down from the surface of the balloon drain out into the conical portion of the outer cone, and the outer cone includes a discharge portion extending downwardly to outside to allow the rainwater to drain out on at least one place of a lower portion of the conical portion.

According to the present invention, the inner cone may include a plurality of wrinkles formed in the longitudinal direction on the surface of the conical portion, and the rainwater guiding device of the present invention may be composed of at least a silicone material or a leather material, etc. so as not to damage the surface of the balloon.

According to the present invention, the outer cone includes an inclined bottom surface to be collectable the rainwater toward the discharge portion, and a space formed between a lower end of the conical portion of the inner cone and a lower end of the conical portion of the outer cone is preferably filled to form a surface inclined toward the discharge portion.

On the other hand, an air gun is used to inject helium gas into the balloon, the air gun comprises a nozzle portion to be press-fitted into the extension portion of the rainwater guiding device in state inserted into the inlet of the balloon.

From the above-mentioned characteristics, the present invention can prevent the observer from getting wet by the rainwater flowing down along the surface of the balloon while injecting helium gas into the balloon for rawinsonde levitation, thereby protecting the health of the observer and preventing electronic devices and sonde sensors held by the observer from a damage causing by rainwater. In addition, the present invention prevents the occurrence of errors in sonde observation data due to rainwater in advance.

DETAILED DESCRIPTION OF THE INVENTION

Figure 1:
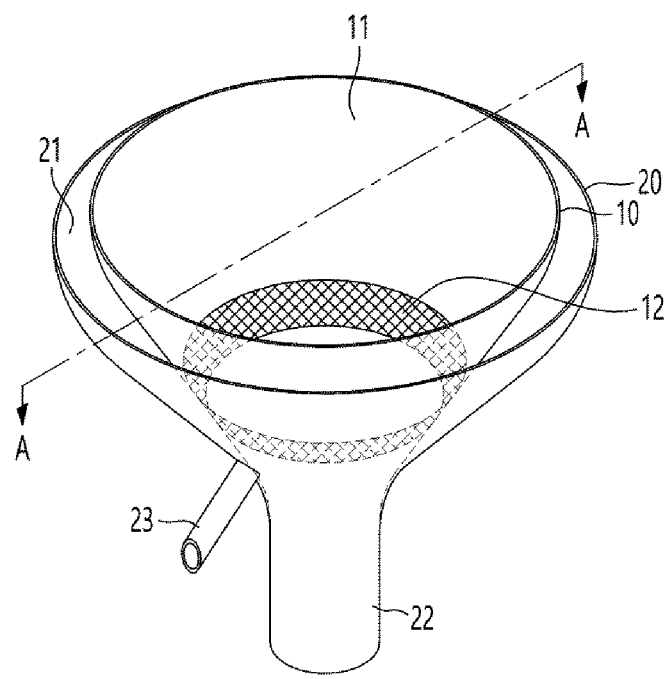
FIG. 1 is an external perspective view of a Rainwater guiding device for a meteorological observation balloon according to the present invention.

Hereinafter, preferred embodiments of the present invention will be described with reference to the accompanying drawings.

In the following embodiments, portions excluding inevitable portions in the explanation of the invention, the illustration and explanation thereof are omitted, and the same reference numerals are assigned to the same or similar elements throughout the description and detailed explanation thereof will be omitted without repetition.

Figure 2:
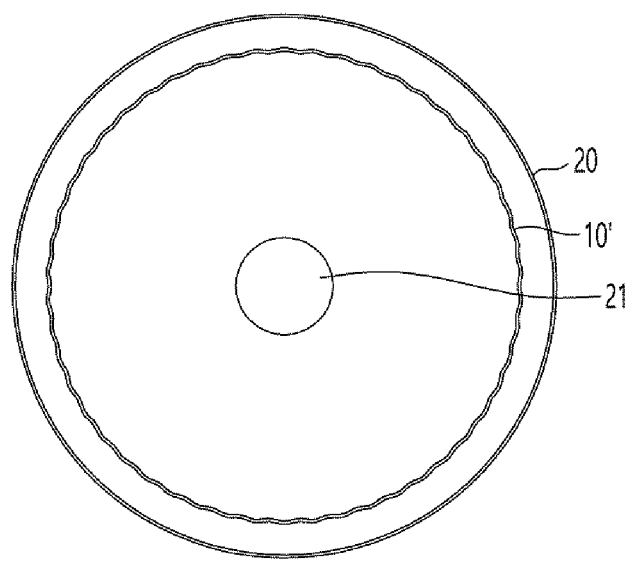
FIG. 2 is a plan view of a modified aspect of the rainwater guiding device for the meteorological observation balloon of FIG. 1.
Figure 3:
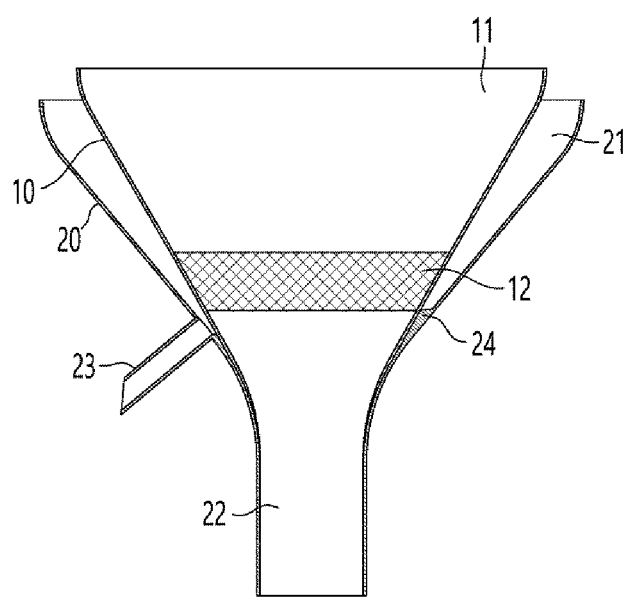
FIG. 3 is a cross-sectional view of the rainwater guiding device for the meteorological observation balloon, taken along line A-A of FIG. 1.
Figure 4:
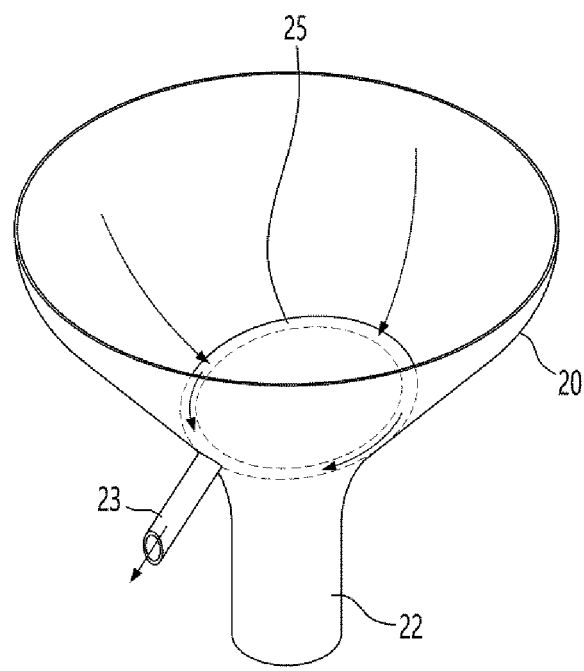
FIG. 4 is a view showing the water path structure and a rainwater flow of an outer cone in the rainwater guiding device of FIG. 1.

The present invention relates to a rainwater guiding device for a meteorological observation balloon provided for the purpose of safely protecting an observer and the electronic devices held by the observer from rainwater by guiding rainwater flowing down along the surface of the balloon to the outside, FIG. 1 is an external perspective view of a rainwater guiding device for a meteorological observation balloon according to the present invention, FIG. 2 is a plan view of a modified aspect of the rainwater guiding device for a meteorological observation balloon of FIG. 1, FIG. 3 is a cross-sectional view of the rainwater guiding device for the meteorological observation balloon, thaken along line A-A of FIG. 1, and FIG. 4 is a view showing the water path structure and rainwater flow in an outer cone in the rainwater guiding device of FIG. 1.

The rainwater guiding device for the meteorological observation balloon of the present invention can be detachably used in combination with an air gun A (see FIG. 5) in order to prevent the observer's body from getting wet by rainwater flowing down from the surface of the balloon B (see FIG. 5) during the injection of helium gas into a balloon B using the air gun A. In addition, the rainwater guiding device of the present invention may be composed of a soft but rigid material, for example, a flexible material such as a silicone material or a leather material in order to prevent the thin surface of the balloon from being damaged.

In order to receive rainwater flowing down along the surface of the balloon B, the rainwater guiding device for the meteorological observation balloon of the present invention has a double-cone structure composed of an inner cone 10 closely contact with the surface adjacent an inlet of the balloon B and an outer cone 20 formed on the outside of the inner cone. The inner cone 10 may be provided in such a way to be integrally coupled to the inner portion of the outer cone 20.

The inner cone 10 and the outer cone 20 have a typical funnel shape. The inner cone 10 and the outer cone 20 include upper conical portions 11 and 21 (hereinafter referred to as 'conical portion(s)') in which the diameter of the conical portion(s) gradually increases as going upwards, and an lower extension portion 22 (hereinafter referred to as 'extension portion') extending vertically downward from a neck portion (hereinafter referred to as 'neck portion') below the conical portions. Here, the conical portion 21 of the outer cone 20 and the conical portion 11 of the inner cone 10 are formed integrally by being joined together at the neck portion, and the extension portion 22 is provided as a single body below the neck portion.

The inner cone 10 may include a mesh-type structure 12 (hereinafter referred to as a 'mesh portion') in at least portion thereof above the neck portion, the mesh-type structure 12 having a plurality of through holes formed therein, in order to let the rainwater seeping or flowing down from the surface of the balloon B drain out into the conical portion 21 of the outer cone 20.

In addition, the inner cone 10 may be configured to have a corrugated cardboard-type surface having a plurality of wrinkles 10' as shown in FIG. 2 in some cases to prevent the inner cone 10 from sticking to the balloon B by the rainwater during the inflation of the balloon B by injecting helium gas. In this way, the respective wrinkles 10' formed on the surface of the conical portion 11 of the inner cone 10 are formed in the longitudinal direction along the circumference of the conical portion 11, and these wrinkles 10' may also serve as a waterway guide groove for guiding rainwater.

The outer cone 20 collects rainwater flowing down from the surface of the balloon B and discharges the collected rainwater to the outside, and a discharge portion 23, which extends downwardly to the outside such that rainwater drain out, is formed at least one place of a lower portion of the conical portion 21. The outer cone 20 includes preferably an inclined bottom surface 25 such that rainwater can collect toward the discharge portion 23. To this end, it is preferable that the bottom surface 25 of the conical portion 21 positioned on the upper portion of the neck portion be provided in a downwardly inclined structure toward the discharge portion 23. Further, an upper space 24 in the neck portion below the mesh portion 12, that is, a space formed between the lower end of the conical portion 11 of the inner cone 10 and the lower end of the conical portion 21 of the outer cone 20 may be filled so as to form a surface inclined toward the discharge portion 23.

Referring to FIG. 3 and FIG. 4, the outer cone 20 has a structure in which the bottom surface 25 is inclined downward toward the discharge portion 23, whereby rainwater flowing down from the surface of the balloon B through the mesh portion 12 to the outer cone 20 is collected on the bottom surface 25 of the conical portion 21 of the outer cone 20 and is discharged through the discharge portion 23 to the outside.

Next, a process of injecting helium gas into the balloon using the rainwater guiding device for the meteorological observation balloon of the above-described configuration will be described.

Figure 5:
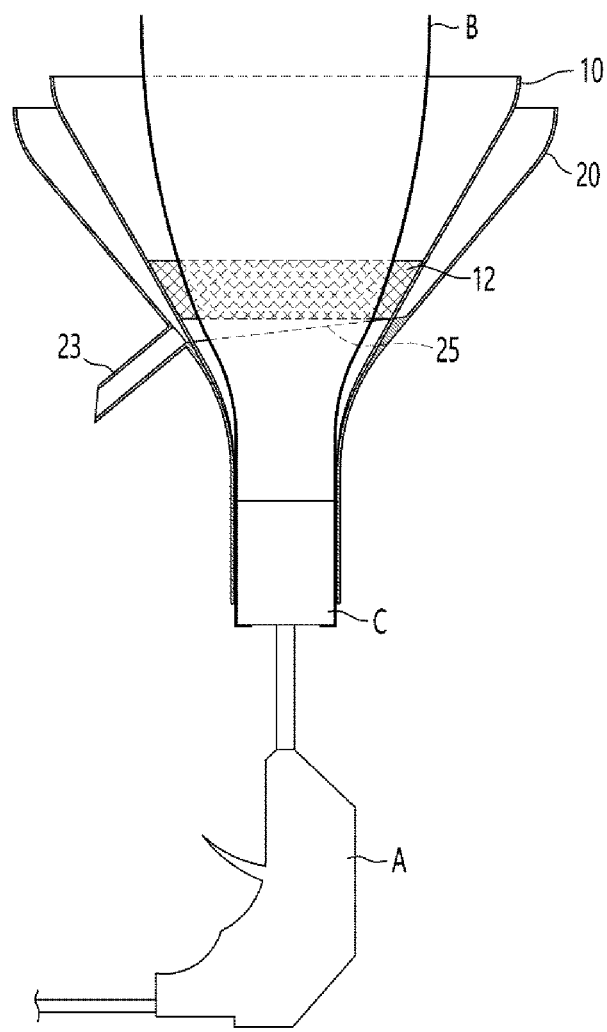
FIG. 5 is a cross-sectional view showing a state in which the rainwater guiding device of FIG. 1 is installed adjacent an inlet of the balloon and a helium gas injector is connected thereto.
Figure 6:
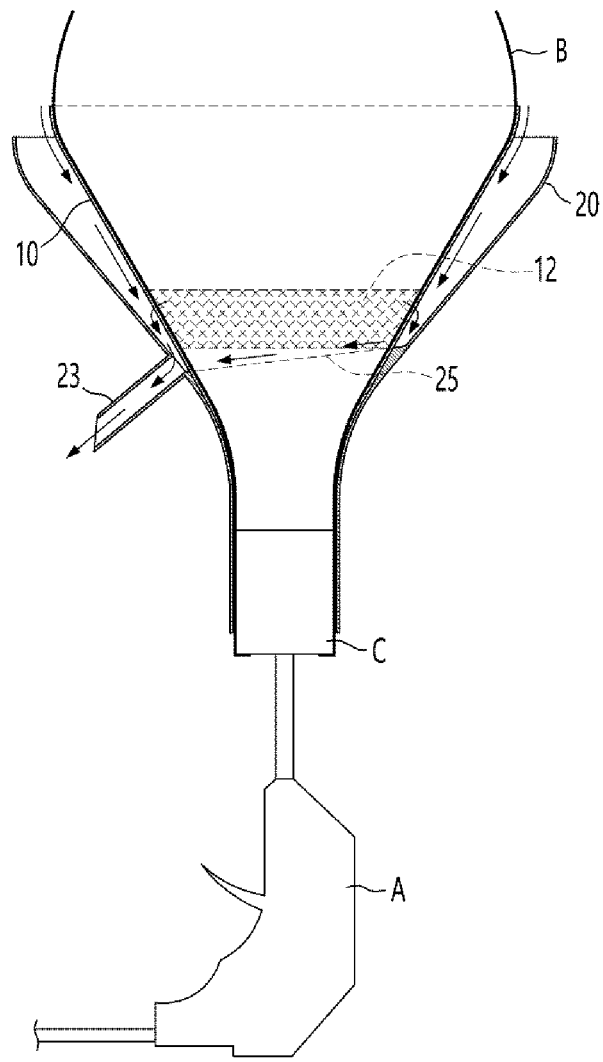
FIG. 6 is a cross-sectional view for explaining a discharge flow process of rainwater in the state of FIG. 5.

FIG. 5 is a cross-sectional view showing a state in which the rainwater guiding device of FIG. 1 is installed on the inlet side of the balloon and a helium gas injector is connected thereto, and FIG. 6 is a cross-sectional view showing a discharge process of rainwater in the state of FIG. 5.

In order to inject helium gas into the balloon B, an air gun A is used. In this embodiment, the air gun A may comprise a nozzle portion C which is inserted into the extension portion 22 of the rainwater guiding device in a state fitted into the inlet of the balloon B.

Referring to FIG. 5, the inlet of the balloon B is inserted into the extension portion 22 through the conical portion 11 of the inner cone 10, and the nozzle portion C of the air gun A is preferably configured to be press-fitted into the extension portion 22 in a state inserted into the inlet of the balloon B.

In this state, a lever of the air gun A is pulled to inject helium gas into the balloon B, and when helium gas is fully injected, the balloon B is typically inflated to a size of 150 cm or more in diameter. Referring to FIG. 6, rainwater flowing down along the surface of the balloon B inflated by gas injection moves along the inclined bottom surface 25 in a state of being collected in the conical portion 21 of the outer cone 20 and is discharged through the discharge portion 23 to the outside. Accordingly, the rainwater flowing down along the surface of the balloon B is guided by the rainwater guiding device of the present invention, whereby the observer's body holding the balloon does not get wet in the rainwater, and electronic devices and sonde sensors held by the observer can be prevented from being damaged by rainwater. In addition, the rainwater guiding device of the present invention also provides an effect of preventing the occurrence of an error value in sonde observation data due to rainwater in advance.

Although various embodiments of the present invention have been described above, the embodiments have been described so far are merely illustrative of some of the preferred embodiments of the present invention, and the scope of the present invention is not limited by the embodiments described above, except for the appended claims. Accordingly, it is understood that those having ordinary knowledge in the same technical field can make many changes, modifications and substitutions of equivalents without departing from the technical spirit and gist of the invention within the scope of the following claims.

LIST OF REFERENCE NUMERALS

10: inner cone
10': wrinkles
11,21: conical portion
12: mesh portion
20: outer cone
22: extension portion
23: discharge portion
24: upper space of neck portion
25: bottom surface
A: air gun
B: balloon
C: nozzle portion

What is claimed is:

1. A rainwater guiding device for a meteorological observation balloon for preventing an observer and electronic devices held by the observer from getting wet by rainwater by guiding the rainwater flowing down along the surface of the balloon to the outside of the observer's workspace during the rawinsonde levitation operation for upper atmospheric observation,
wherein the rainwater guiding device has a double-cone structure composed of an inner cone closely contact with the surface adjacent an inlet of the balloon and an outer cone formed on the outside of the inner cone, wherein the inner cone and the outer cone have a funnel shape, each of which includes an upper conical portion in which the diameter gradually increases as going upwards, and a lower extension portion extending vertically downward from a neck portion below the conical portions, wherein the conical portion of the outer cone and the conical portion of the inner cone are formed integrally by being joined together at the neck portion, and the extension portion is provided as a single body below the neck portion.

2. The rainwater guiding device for a meteorological observation balloon according to claim 1, wherein the inner cone includes a mesh portion in at least a portion thereof above the neck portion, the mesh portion having a plurality of through holes formed therein in order to let the rainwater flowing down from the surface of the balloon drain out into the conical portion of the outer cone, and the outer cone includes a discharge portion extending downwardly to outside to allow the rainwater to drain out on at least one place of a lower portion of the conical portion.

3. The rainwater guiding device for a meteorological observation balloon according to claim 1, wherein the inner cone includes a plurality of wrinkles formed on the surface of the conical portion.

4. The rainwater guiding device for a meteorological observation balloon according to claim 2, wherein the outer cone includes an inclined bottom surface to be collectable the rainwater toward the discharge portion, and a space formed between a lower end of the conical portion of the inner cone and a lower end of the conical portion of the outer cone is filled to form a surface inclined toward the discharge portion.

5. The rainwater guiding device for a meteorological observation balloon according to claim 1, wherein the rainwater guiding device can be composed of at least a silicone material or a leather material so as not to damage the surface of the balloon.

6. The rainwater guiding device for a meteorological observation balloon according to claim 1, wherein an air gun is used to inject helium gas into the balloon, the air gun comprises a nozzle portion to be press-fitted into the extension portion of the rainwater guiding device in state inserted into the inlet of the balloon.

* * * * *